(12) United States Patent
Konagaya et al.

(10) Patent No.: US 7,926,963 B2
(45) Date of Patent: Apr. 19, 2011

(54) DISPLAY DEVICE

(75) Inventors: Tetsuo Konagaya, Shimada (JP);
Tetsuya Maebashi, Shimada (JP)

(73) Assignee: Yazaki Corporation, Tokyo (JP)

( * ) Notice: Subject to any disclaimer, the term of this patent is extended or adjusted under 35 U.S.C. 154(b) by 12 days.

(21) Appl. No.: 11/946,086

(22) Filed: Nov. 28, 2007

(65) Prior Publication Data
US 2008/0127883 A1    Jun. 5, 2008

(30) Foreign Application Priority Data
Nov. 30, 2006    (JP) .................................. 2006-323774

(51) Int. Cl.
*G01D 11/28*    (2006.01)
(52) U.S. Cl. ................. 362/23; 362/28; 362/29
(58) Field of Classification Search .................... 362/23, 362/26, 27, 28, 29, 30
See application file for complete search history.

(56) References Cited

U.S. PATENT DOCUMENTS

| | | | |
|---|---|---|---|
| 4,975,807 A * | 12/1990 | Ohashi ........................... | 362/23 |
| 5,130,548 A * | 7/1992 | Sano et al. .................. | 250/461.1 |
| 6,588,924 B1 * | 7/2003 | Friepes ......................... | 362/489 |
| 6,990,922 B2 * | 1/2006 | Ichikawa et al. .............. | 116/286 |
| 7,553,036 B2 * | 6/2009 | Tsurumi ......................... | 362/23 |

FOREIGN PATENT DOCUMENTS
JP    2006-003341 A    1/2006

* cited by examiner

*Primary Examiner* — Y My Quach Lee
(74) *Attorney, Agent, or Firm* — Sughrue Mion, PLLC

(57) ABSTRACT

A display device includes a dial portion which includes a design part having an index, a pointing portion which rotates along a front surface of the dial portion for pointing to the index, an ornamental member which is arranged on the front surface of the dial portion so as to surround the design part, a face glass portion which covers the dial, the pointing portion and the ornamental member, and a light source which illuminates light onto a rear surface of the dial portion for brightening the index with the light. A smoked layer is provided on the front surface of the dial portion. The smoked layer has a lower light transmittance than that of the face glass portion.

16 Claims, 5 Drawing Sheets

DISPLAY DEVICE

BACKGROUND

The present invention relates to a display device that may be preferably used as a vehicular display device mounted on a vehicle such as an automobile.

Among the vehicular display devices for displaying various information by indicating with a pointer an index such as a scale or a character provided in the design part of a dial, black-face type display devices have been recently used that includes a face glass plate covering a dial or a pointer formed by a dark-color material and is designed to illuminate light onto the rear surface of the dial to cause a pointer or an index to appear distinctively. Such black-face type display devices are resistant to the brightness outside the vehicle and are generally excellent in visibility.

With a related black-face type display device, the face glass plate is formed by a dark-color material. Thus, the entire face glass plate uniformly looks pitch-black when a light source to illuminate light onto the rear surface of the dial is turned off. This results in a monotonous and frigid appearance.

In order to eliminate such demerits, as shown in FIG. 6, there has been proposed a vehicular display device 50 which includes a smoked plate 51 covering a dial 54 and a pointer 55 and an another smoked plate 52 covering the smoked plate 51 and an ornamental metallic cover 56 surrounding the smoked plate 51.

In the vehicular display device 50, when a light-emitting diode 57 is turned on, the dial 54 and the pointer 55 is visible through the smoked plate 52 and the smoked plate 51, and the metallic cover 56 is visible through the smoked plate 52. When the light-emitting diode 57 is turned off, the dial 54 and the pointer 55 are hidden through the smoked plate 52 and the smoked plate 51. The light transmittance of the smoked plate 52 is set higher than that of the smoked plate 51 so that the metallic cover 56 remains visible through the smoked plate 52.

The related art display device disclosed in JP-A-2006-3341 uses two smoked plates 51, 52 in order to constantly make visible the metallic cover 56, which results in a complicated structure. Another problem is that the smoked plate 51 acts as a reflecting surface and the smoked plate 51 is conspicuously reflected on the smoked plate 52.

SUMMARY

The invention has been accomplished in view of the above circumstances. An object of the invention is to provide a simple-structured display device with reduced reflection capable of obtaining a novel appearance even when a light source is turned off.

The above object is attained by a display device according to the invention as directed below.

There is provided a display device comprising:
a dial portion which includes a design part having an index;
a pointing portion which rotates along a front surface of the dial portion for pointing to the index;
an ornamental member which is provided on the front surface of the dial portion so as to surround the design part;
a face glass portion which covers the dial portion, the pointing portion and the ornamental member; and
a light source which illuminates light onto a rear surface of the dial portion for brightening the index with the light,
wherein a smoked layer is provided on the front surface of the dial portion; and
wherein the smoked layer has a lower light transmittance than that of the face glass portion.

Preferably, the smoked layer has a coarse surface.

With the display device thus configured, a smoked layer having a lower light transmittance than that of the face glass portion is provided on the surface of the dial portion. When a light source is turned off, the pointing portion and the ornamental member are made visible through the face glass portion and the index on the dial portion can be hidden with the smoked layer. When the light source is turned on, the pointing option, the ornamental member and the bright index are made visible through the face glass portion and the smoked layer. Even when the light source is turned off, the pointing portion and the ornamental member are made visible, which offers a novel appearance. It is thus possible to reduce the number of components compared with a related case where two smoked plates are used, thereby simplifying the structure of the display device. Further, the smoked layer is not intended to cover the pointing portion, thus causing no influence on the visibility of the pointing portion. It is thus possible to provide the smoked layer with a coarse surface, thus reducing reflection on the face glass portion.

The invention provides a simple-structured display device with reduced reflection and a novel appearance even when a light source is turned off.

BRIEF DESCRIPTION OF THE DRAWINGS

The above objects and advantages of the present invention will become more apparent by describing in detail preferred exemplary embodiments thereof with reference to the accompanying drawings, wherein:

FIG. 1A is a front view of the display device with a light source turned off, and FIG. 1B is a front view of the display device with a light source turned on;

DETAILED DESCRIPTION OF EXEMPLARY EMBODIMENTS

A preferred embodiment of the invention will be described referring to drawings.

Figure 1A:
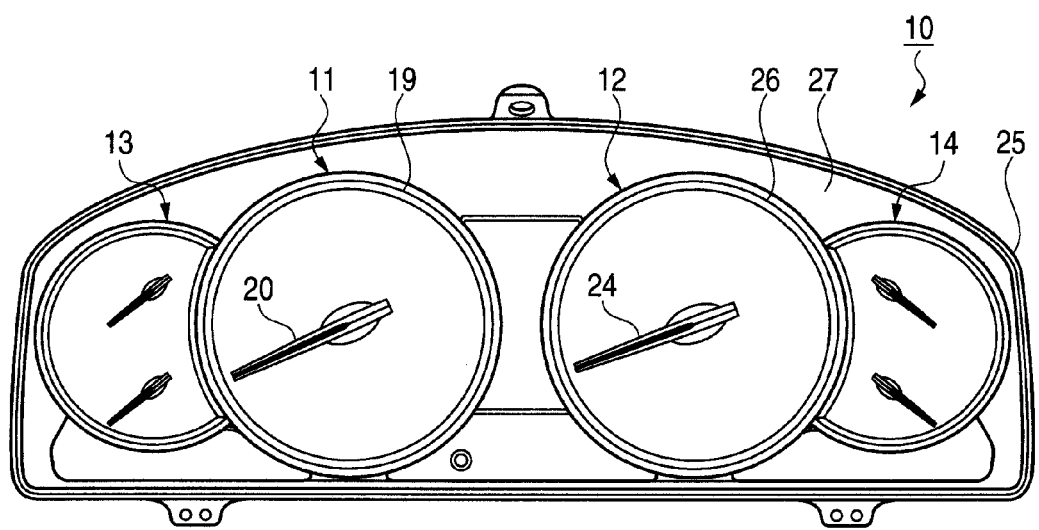
FIGS. 1A and 1B are front views of a display device according to an embodiment of the invention.
Figure 1B:
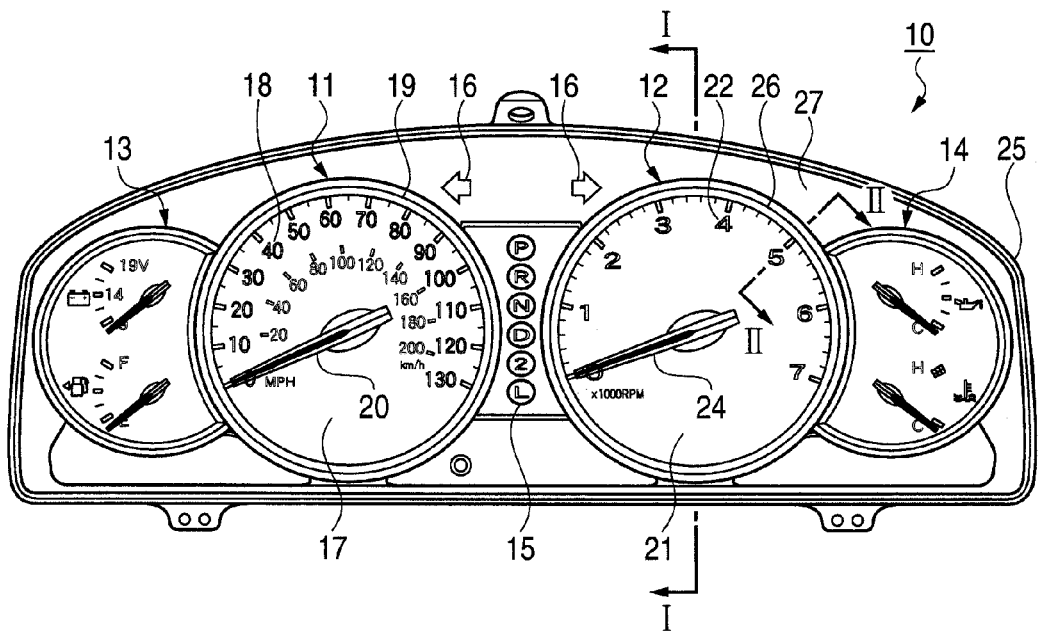
Figure 2:
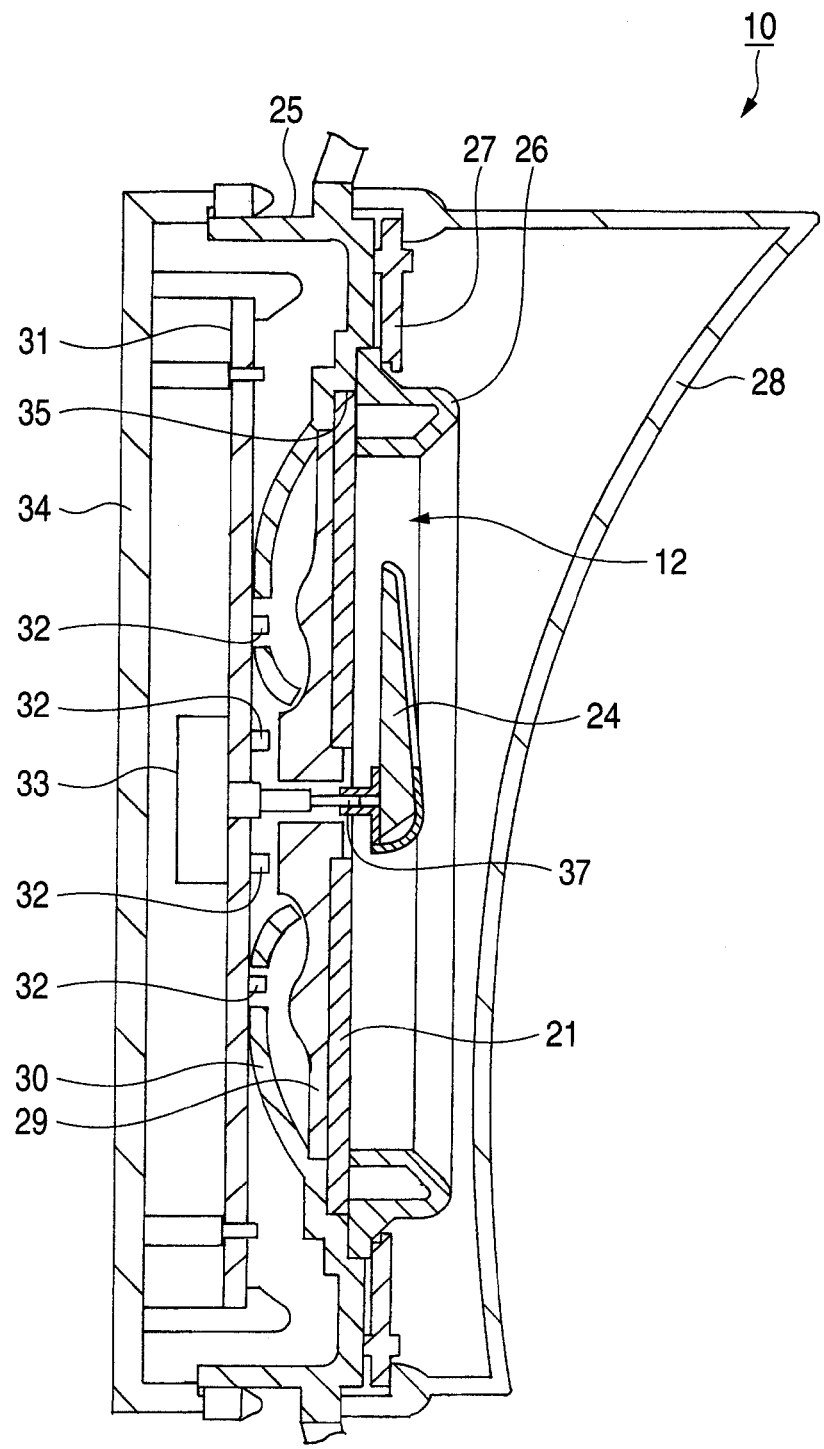
FIG. 2 is a cross-sectional view of the display device in FIG. 1B along line I-I.
Figure 3:
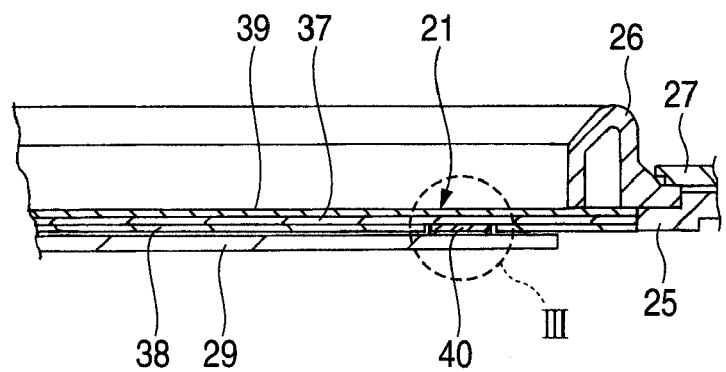
FIG. 3 is a cross-sectional view of the display device in FIG. 1B along line II-II.
Figure 4:
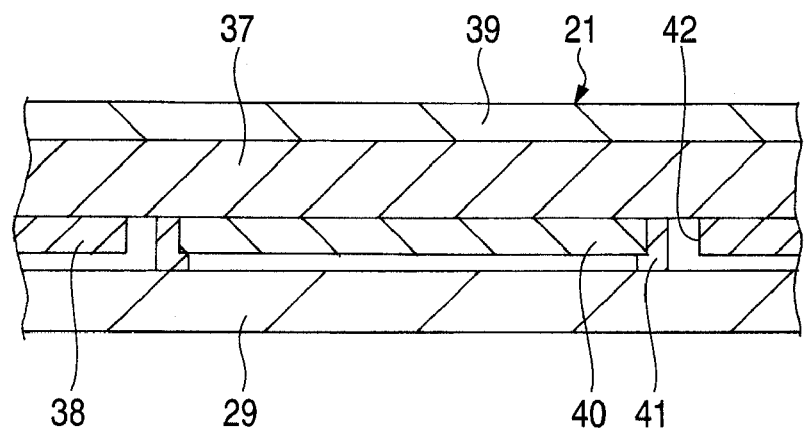
FIG. 4 is an enlarged view of a portion enclosed by the dotted-line circle III in FIG. 3.
Figure 5:
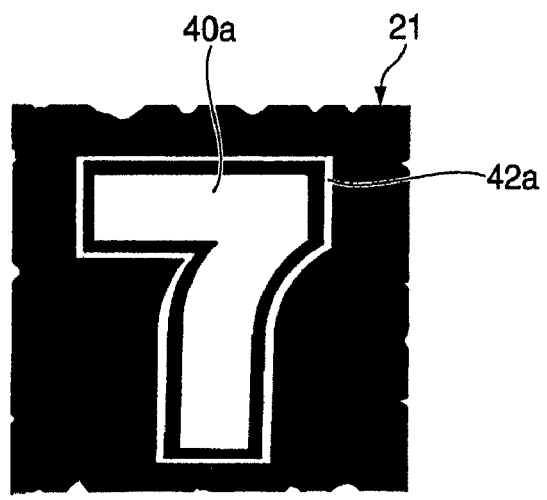
FIG. 5 is a front view of the dial design part in FIG. 1B.
Figure 6:
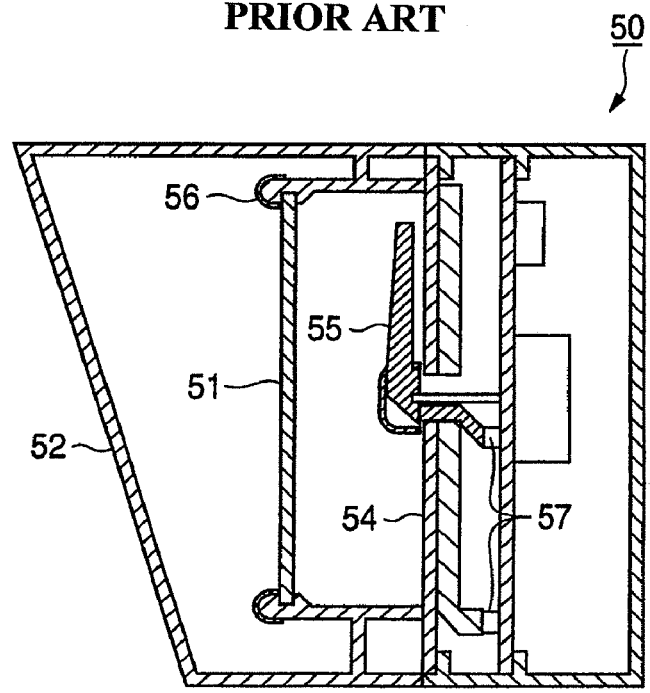
FIG. 6 is a cross-sectional view of a related vehicular display device.

FIGS. 1A and 1B are front views of a display device according to an embodiment of the invention. FIG. 1A is a front view of the display device with a light source turned off. FIG. 1B is a front view of the display device with a light source turned on. FIG. 2 is a cross-sectional view of the display device in FIG. 1B along line I-I. FIG. 3 is a cross-sectional view of the display device in FIG. 1B along line II-II. FIG. 4 is an enlarged view of a portion enclosed by the dotted-line circle III in FIG. 3. FIG. 5 is a front view of the dial design part in FIGS. 1A and 1B.

As shown in FIGS. 1A and 1B, the display device 10 according to an embodiment of the invention is a combination meter which includes a speedometer 11, a tachometer 12, a residual fuel amount gauge 13, a heat indicator 14, a transmission position display part 15, and a pair of winker display parts 16.

The speedometer 11 includes a dial 17 formed into a circle and having a design part 18 where a numeral and a scale for speed display are arranged in the circumferential direction of its outer edge, a pointer 20 rotating along the surface of the dial 17 and pointing to the numeral and the scale on the design part 18, and an ornamental ring 19 arranged on the surface of the dial 17 and surrounding the design part 18.

The tachometer 12 includes a dial 21 formed into a circle and having a design part 22 where a numeral and a scale for display of a rotational speed are arranged in the circumferential direction of its outer edge, a pointer 24 rotating along the surface of the dial 21 and pointing to the numeral and the scale on the design part 22, and an ornamental ring 26 arranged on the surface of the dial 21 and surrounding the design part 22.

Same as the tachometer 12, the residual fuel amount gauge 13 and the heat indicator 14 each includes a dial and a pointer. The transmission position display part 15 and the winker display part 16 each includes a dial having a design part where an index such as a character or a symbol is provided.

The structure of the display device 10 will be described taking the tachometer 12 as an example. As shown in FIG. 2, a pointer 24, an ornamental ring 26, a facing plate 27, and a face glass plate 28 are arranged on the front surface of the dial 21 assembled with the case 25. A light guide member 29, a reflector 30, a substrate 31, a light source 32, a movement 33, and a rear cover 34 are arranged on the rear surface of the dial 21.

The case 25 includes a circular mounting part 35. The dial 21 is assembled with the mounting part 35 and has its rear surface on the outer edge supported by the case 25.

The ornamental ring 26 is formed into a circular frame surrounding the design part 22. The ornamental ring 26 is arranged on the surface of the dial 21 and assembled with the case 25 so as to sandwich the outer edge of the dial 21 between the ornamental ring 26 and the case 25.

The facing plate 27 is assembled with the case 25 so as to sandwich the outer edge of the ornamental ring 26 between the facing plate 27 and the case 25. This fixes the dial 21 and the ornamental ring 26 to the case 25.

The pointer 24 rotates coaxially with the dial 21 along the surface of the dial 21 and points to the numeral and the scale on the design part 22 with its pointing part at the tip. The pointer 24 is formed of a material with light permeability such as a transparent polycarbonate resin or an acrylic resin and is brightened with illuminating light from an LED 32 mentioned later.

The face glass plate 28 is formed of a material with light permeability such as a transparent polycarbonate resin or an acrylic resin and is colored in a dark color tone and assembled with the case 25 while covering the facing plate 27, the ornamental ring 26, the pointer 24, and the dial 21.

The substrate 31 is assembled with a rear cover 34 assembled with the case 25 and is arranged while leaving a spacing from the rear surface of the dial 21. The substrate 31 mounts a plurality of LEDs 32 for illuminating light onto the rear surface of the dial 21, a movement 3 for driving the pointer 24 via a pointer shaft 27, a control circuit (not shown) for controlling turning on/off of the LED 32 and operation of the movement 33, and the like.

The reflector 30 is arranged between the dial 21 and the substrate 31 while surrounding the LED 32. The reflector 30 is designed to reflect illuminating light from the LED 32 onto the rear surface of the dial 21. In this embodiment, the front surface of a predetermined area of the case 25 is mirror-finished for example and the area serves as the reflector 30.

The light guide member 29 is arranged between the reflector 30 and the substrate 31, and the dial 21. The light guide member 29 is formed of a material with light permeability such as a transparent polycarbonate resin or an acrylic resin and gathers illuminating light from the LED 32 and reflected light from the reflector 30, and guides the light to the pointer 24 or design part 22 on the dial 21.

As shown in FIGS. 3 and 4, the dial 21 includes, a material 37 formed of a material with light permeability such as a transparent polycarbonate resin or an acrylic resin, a light-shielding layer 38, a colored layer 40 with light permeability and a smoked layer 39. The light-shielding layer 38 is laminated elsewhere than an area where the index of the design part 22 is provided, on the rear surface of the material 37. The colored layer 40 has a shape corresponding to the shape of the index and is laminated in the area where the index is provided on the rear surface of the material 37. The smoked layer 39 is laminated on entire surface of the material 37.

The smoked layer 39 is colored in a dark color tone similar to the face glass plate 28 and is set to a predetermined light transmittance. When the LED 32 is turned off, the index provided on the index part 22 of the dial 21 is hidden by the smoked layer 39 and the dial 21 is entirely perceived in the color tone of the smoked layer 39. When the LED 32 is turned on, the index on the dial 21 receives illuminating light from the LED 32 and is brightened in the color tone of the colored layer 40. The bright index is distinctively perceived over the dark area of the dial 21 except the area of the index.

As shown in FIGS. 4 and 5, the colored layer 40 is trimmed by a light-shielding material 41. A trimmed part 42, in which the material 37 is exposed, is arranged outside the colored layer 40. When the LED 32 is turned on, the illuminating light passes through the trimmed part 42, and a thin belt 42a that is bright in the color tone of the LED 32 or material 37 is generated so as to trim the index 40a brightened in the color tone of the colored layer 40 with a spacing corresponding to the width of the light-shielding material 41. This emphasizes the contour of the index thus enhancing visibility.

Figure 7:
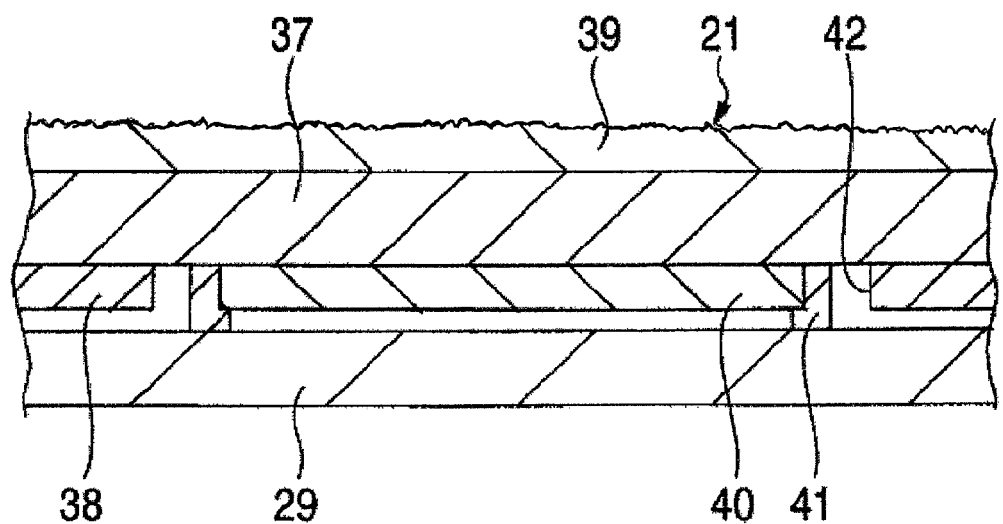
FIG. 7 is an enlarged view of a portion enclosed by the dotted-line circle III in FIG. 3 that shows the smoked layer 39 having a coarse surface.

The smoked layer 39 has a coarse surface (as shown in FIG. 7) thus preventing extraneous light from being reflected onto the face glass plate 28 in the dial 21.

With the display device 10 thus configured, the pointer 24 and the ornamental ring 26 are visible through the face glass plate 28. The index provided on the design part 22 of the dial 21 is visible through the face glass plate 28 and the smoked layer 39 of the dial 21.

The smoked layer 39 is set to a lower light transmittance than that of the face glass plate 28. To be more precise, as shown in FIG. 1A, the face glass plate 28 is set to a light transmittance to make visible the pointer 24 and the ornamental ring 26 under natural light even when the LED 32 is turned off. The smoked layer 39 is set to a light transmittance with which the index is hidden under natural light and the index is visible when the light from the LED 32 with a higher luminous intensity than natural light is illuminated onto the rear surface of the dial 21 as shown in FIG. 1B. The pointer 24 and the ornamental ring 26 are always visible irrespective of whether the LED 32 is turned on or off. On the display device 10 appear the pointer 24 and the ornamental ring 26 even when the LED 32 is turned off.

As described above, with the display device 10 according to this embodiment, the smoked layer 39 set to a lower light transmittance than that of the face glass plate 28 is provided on the front surface of the dial 21. The pointer 24 and the ornamental ring 26 are made visible through the face glass plate 28 and the index on the dial 21 can be hidden with the smoked layer 39 when the LED 32 is turned off. The pointer 24 and the ornamental ring 26 as well as the brightened index are made visible through the face glass plate 28 the smoked layer 39 when the LED 32 is turned on. That is, the pointer 24 and the ornamental ring 26 are made visible even when the LED 32 is turned off, which provides a novel appearance. It is thus possible to reduce the number of components compared with a related art case where two smoked plates are used, thereby simplifying the structure of the display device 10. The smoked layer 39 is not intended to cover the pointer 24, thus causing no influence on the visibility of the pointer 24. It is thus possible to provide the smoked layer 39 with a coarse surface (as shown in FIG. 7), thus reducing reflection on the face glass plate 28.

The invention is not limited to the above embodiment but may be modified or improved as required. The material, shape, dimensions, numeric values, form, number, location of each component in the above embodiment may be arbitrary and is not limited as long as the invention is attained.

What is claimed is:

1. A display device comprising:
    a dial portion which includes a design part having an index;
    a pointing portion which rotates along a front surface of the dial portion for pointing to the index;
    an ornamental member which is provided on the front surface of the dial portion so as to surround the design part;
    a cover which covers the dial portion, the pointing portion and the ornamental member; and
    a light source which illuminates light onto a rear surface of the dial portion for brightening the index with the light,
    wherein a smoked layer is provided on the front surface of the dial portion;
    wherein the smoked layer allows light to pass there through but has a lower light transmittance than that of the cover;
    wherein the index is a scale corresponding to a parameter and the pointing portion indicates a value of the parameter by pointing to a particular portion of the scale; and
    wherein the smoked layer covers the scale.

2. The display device according to claim 1, wherein the smoked layer has a coarse surface.

3. The display device according to claim 1, wherein the design part of the dial portion has at lease one of a scale and a character.

4. The display device according to claim 1, wherein the ornamental member is visible when the light source is turned on and when the light source is turned off.

5. The display device according to claim 2, wherein the coarse surface is provided on a top surface of the smoked layer which is opposite the front surface of the dial portion.

6. The display device according to claim 1, wherein the ornamental member and the pointing portion are arranged between the cover and the smoked layer.

7. The display device according to claim 1,
    wherein the display device is made for use in a vehicle;
    wherein the dial portion is one of a speedometer, a tachometer, a fuel gauge, a voltmeter, an oil temperature gauge, and a water temperature gauge;
    wherein the index describes a speed of the vehicle if the dial portion is a speedometer, an engine revolution speed if the dial portion is tachometer, an amount of fuel of the vehicle if the dial portion is a fuel gauge, a voltage of a battery if the dial portion is a voltmeter, a temperature of oil if the dial portion is an oil temperature gauge, or a pressure of the oil if the dial portion is a water temperature gauge; and
    wherein the pointing portion indicates the speed of the vehicle if the dial portion is a speedometer, the engine revolution speed if the dial portion is tachometer, the amount of fuel of the vehicle if the dial portion is a fuel gauge, the voltage of a battery if the dial portion is a voltmeter, the temperature of the oil if the dial portion is an oil temperature gauge, or the pressure of the oil if the dial portion is a water temperature gauge by pointing to the index.

8. The display device according to claim 1,
    wherein the ornamental member surrounds the pointing portion;
    wherein another index is provided on the display device outside an area that is surrounded by the ornamental member; and
    wherein the smoked layer does not cover the ornamental member.

9. The display device according to claim 8,
    wherein both the ornamental member and the pointing portion are visible under natural light when the light source is both turned on and turned off;
    wherein the index is not visible in natural light when the light source is turned off; and
    wherein the index is visible in natural light when the light source is turned on.

10. The display device according to claim 1, wherein the scale comprises numerals or characters.

11. The display device according to claim 1, wherein the scale comprises hatch marks.

12. The display device according to claim 1, wherein the scale comprises both numerals or characters and hatch marks.

13. The display device according to claim 1,
    wherein a direction extending from the rear surface of the dial portion to the front surface of the dial portion is an outward direction; and
    wherein the smoked layer is provided from the scale in the outward direction.

14. The display device according to claim 1, wherein the dial portion includes a light-shielding layer that is covered by the smoked layer.

15. The display device according to claim 1, wherein the scale includes a colored layer with light permeability, and a light-shielding material provided on an edge of the colored layer.

16. The display device according to claim 15, wherein the scale further includes a trimmed part in which the edge of the colored layer is trimmed and which is provided outside the light-shielding material.

* * * * *